United States Patent
Dong et al.

(10) Patent No.: US 10,423,456 B2
(45) Date of Patent: Sep. 24, 2019

(54) DYNAMIC ADJUSTMENT OF RESOURCE UTILIZATION THRESHOLDS

(71) Applicant: Hewlett Packard Enterprise Development LP, Houston, TX (US)

(72) Inventors: Jing Dong, Roseville, CA (US); Phyllis Gallagher, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 116 days.

(21) Appl. No.: 15/329,332

(22) PCT Filed: Jul. 31, 2014

(86) PCT No.: PCT/US2014/049267
§ 371 (c)(1),
(2) Date: Jan. 26, 2017

(87) PCT Pub. No.: WO2016/018401
PCT Pub. Date: Feb. 4, 2016

(65) Prior Publication Data
US 2017/0228257 A1    Aug. 10, 2017

(51) Int. Cl.
*G06F 9/50* (2006.01)
*G06Q 10/04* (2012.01)

(52) U.S. Cl.
CPC ............ *G06F 9/5027* (2013.01); *G06Q 10/04* (2013.01); *G06F 2209/504* (2013.01); *Y02D 10/22* (2018.01)

(58) Field of Classification Search
None
See application file for complete search history.

(56) References Cited

U.S. PATENT DOCUMENTS

| 7,249,043 B1 * | 7/2007 | Trout, II ............... G06Q 10/06 705/7.25 |
| 8,321,558 B1 * | 11/2012 | Sirota ................... G06F 9/5011 709/224 |
| 8,346,921 B1 * | 1/2013 | Goodspeed ............ G06Q 30/02 709/200 |

(Continued)

FOREIGN PATENT DOCUMENTS

| CN | 101750438 A | 6/2010 |
| CN | 102881107 A | 1/2013 |

OTHER PUBLICATIONS

International Searching Authority, "Notfication Of Transmittal Of The International Search Report And The Written Opinion", PCT/US2014/049267, dated Apr. 21, 2015, 9 pages.

(Continued)

*Primary Examiner* — Abu Zar Ghaffari
(74) *Attorney, Agent, or Firm* — Brooks, Cameron & Huebsch, PLLC

(57) ABSTRACT

Apparatuses and methods related to dynamical adjustment of thresholds are disclosed. A method for dynamic adjustment of thresholds may include obtaining costs related to computing resources that have been used by a user. A resource utilization threshold may be dynamically adjusted based on at least one parameter. The at least one parameter may comprise the costs related to the computing resources that have been used by the user. A utilization rate of the computing resources by the user may be compared to the adjusted threshold.

13 Claims, 5 Drawing Sheets

(56) References Cited

U.S. PATENT DOCUMENTS

| | | | |
|---|---|---|---|
| 8,374,929 B1 * | 2/2013 | Lappas | G06Q 30/04 370/219 |
| 8,457,928 B2 | 6/2013 | Dang et al. | |
| 8,667,494 B1 * | 3/2014 | Riordan | G06F 9/5011 718/104 |
| 8,676,540 B1 | 3/2014 | Welch et al. | |
| 8,826,293 B2 * | 9/2014 | Jaquet | G06F 9/5016 715/739 |
| 8,832,219 B2 * | 9/2014 | Morgan | H04L 12/1453 709/203 |
| 8,856,797 B1 * | 10/2014 | Siddiqui | G06F 9/46 718/104 |
| 9,239,996 B2 * | 1/2016 | Moorthi | G06Q 10/06 |
| 9,497,136 B1 * | 11/2016 | Ramarao | G06F 9/45558 |
| 9,710,830 B1 * | 7/2017 | Vermeulen | G06Q 30/02 |
| 2012/0016994 A1 | 1/2012 | Nakamura et al. | |
| 2012/0246646 A1 * | 9/2012 | Bakman | G06Q 30/02 718/1 |
| 2013/0346614 A1 * | 12/2013 | Baughman | G06F 9/5083 709/226 |
| 2014/0040895 A1 * | 2/2014 | Peng | G06F 9/45533 718/1 |
| 2014/0049545 A1 * | 2/2014 | Losee | G06Q 30/0207 345/440 |
| 2014/0058871 A1 | 2/2014 | Marr et al. | |
| 2014/0077968 A1 | 3/2014 | Alberth et al. | |
| 2014/0082625 A1 | 3/2014 | Busava et al. | |
| 2014/0089917 A1 | 3/2014 | Attalla et al. | |
| 2014/0137110 A1 | 5/2014 | Engle et al. | |
| 2014/0172122 A1 * | 6/2014 | Ricket | G06F 1/26 700/12 |
| 2014/0244843 A1 * | 8/2014 | Cao | H04L 67/322 709/226 |
| 2014/0336838 A1 * | 11/2014 | Yon | G01R 21/133 700/297 |
| 2015/0066231 A1 * | 3/2015 | Clifton | G05F 1/66 700/296 |

OTHER PUBLICATIONS

Klaus,M., "VMware Cloud Management", VMWare Blogs, Jul. 25, 2012, 5 pages.

Meng, S., et al. "Reliable State Monitoring In Cloud Datacenters." Cloud Computing (CLOUD), 2012 IEEE 5th International Conference on. IEEE, 2012, 8 pages.

Unknown, "Auto Scaling Developer Guide", Jan. 1, 2011, pp. 1-299, API Version, Amazon Web Services, Inc.

VMware, "Sophisticated Dynamic Thresholds: With VMware vCenter Operations", Technical White Paper, 2011, pp. 1-6, VMware, Inc.

* cited by examiner

DYNAMIC ADJUSTMENT OF RESOURCE UTILIZATION THRESHOLDS

BACKGROUND

Computing resources monitoring tools monitor a utilization rate of computing resources and trigger an alert or an automatic scaling action when the utilization rate exceeds a resource utilization threshold. The resource utilization threshold is defined as a fixed value. Such fixed thresholds used for monitoring the utilization rate fail to accommodate dynamically changing circumstances, causing false alarm signals and a waste of computing resources.

BRIEF DESCRIPTION OF THE DRAWINGS

The following detailed description references the drawings, wherein.

DETAILED DESCRIPTION

Figure 1:
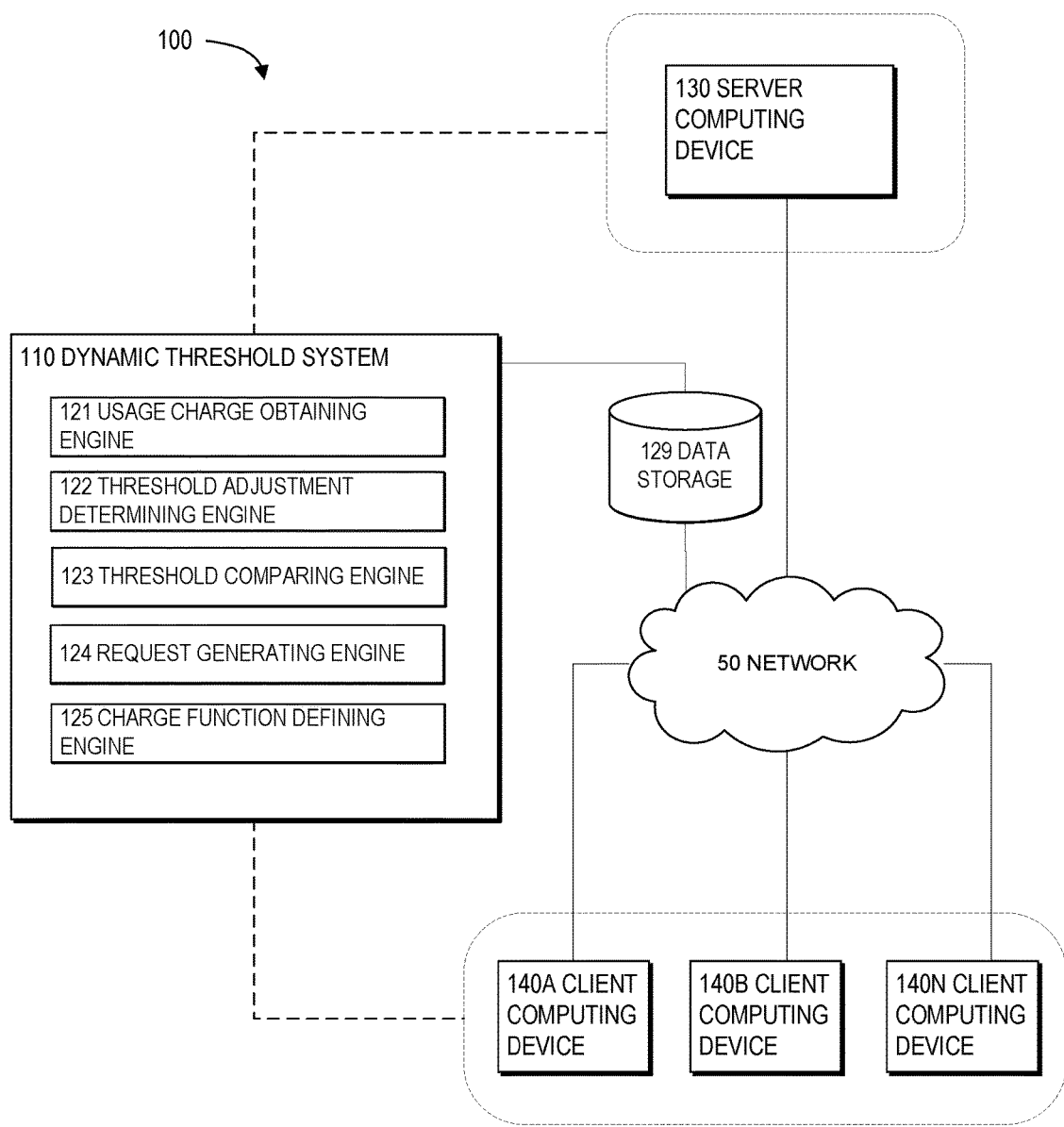
FIG. 1 is a block diagram depicting an example environment in which various examples may be implemented as a dynamic threshold system.

A method for execution by a computing device for dynamically adjusting thresholds is described herein, where the method includes obtaining a rate of costs related to computing resources that have been used by a user over a time period, dynamically adjusting a resource utilization threshold based on at least one parameter, the at least one parameter comprising the rate of costs related to the computing resources that have been used by the user, and comparing a utilization rate of the computing resources by the user to the adjusted threshold.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Computing resources monitoring tools monitor a utilization rate of computing resources and trigger an alert or an automatic scaling action when the utilization rate exceeds a resource utilization threshold. The resource utilization threshold is defined as a fixed value. Although the fixed threshold may be manually set and reset, it is not being dynamically adjusted based on certain external circumstances that may affect the utilization rate. Such fixed thresholds used for monitoring the utilization rate fail to accommodate dynamically changing circumstances, causing false alarm signals and a waste of computing resources. For example, fluctuations of resource utilization may not be always caused by workload requests. Scheduled virus scans or patches, for example, may temporarily increase the resource utilization. False alarms may be caused due to the spikes of such scheduled events. In another example, various external factors such as costs of using the resources and a location of the resources may increase or decrease the resource utilization rate, which may trigger an automatic scaling action that is inadequate or wasteful.

Examples disclosed herein address these issues by dynamically adjusting the resource utilization threshold based on at least one parameter. The at least one parameter may comprise costs related to computing resources that have been used by a user, a predetermined schedule, a geographical location of the computing resources, a temperature of at least one server computing device that provides at least a portion of the computing resources or the temperature of a space where the at least one server computing device is located, carbon footprint (e.g., energy and/or space usages), and/or other parameters.

FIG. 1 is an example environment 100 in which various examples may be implemented as a dynamic threshold system 110. Environment 100 may include various components including server computing device 130 and client computing devices 140 (illustrated as 140A, 140B, . . . , 140N). Each client computing device 140A, 140B, . . . , 140N may communicate requests to and/or receive responses from server computing device 130. Server computing device 130 may receive and/or respond to requests from client computing devices 140. Client computing devices 140 may include any type of computing device providing a user interface through which a user can interact with a software application. For example, client computing devices 140 may include a laptop computing device, a desktop computing device, an all-in-one computing device, a tablet computing device, a mobile phone, an electronic book reader, a network-enabled appliance such as a "Smart" television, and/or other electronic device suitable for displaying a user interface and processing user interactions with the displayed interface. While server computing device 130 is depicted as a single computing device, server computing device 130 may include any number of integrated or distributed computing devices serving at least one software application for consumption by client computing devices 140.

The various components (e.g., components 129, 130, and 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, dynamic threshold system 110 and the various components described herein may be implemented in hardware and/or programming that configures hardware. Furthermore, in FIG. 1 and other Figures described herein, different numbers of components or entities than depicted may be used.

Dynamic threshold system 110 may obtain a budget available to a user for a time period and obtain costs related to computing resources that have been used by the user from a beginning of the time period to a current time. A resource utilization threshold may be dynamically adjusted based on at least one parameter including the costs. A function of the usage costs may define a relationship between the costs and an adjustment value. In some implementations, the function of costs may be determined based on historical usage charge information associated with the user.

Dynamic threshold system 110 may compare a current utilization rate of the computing resources by the user to the adjusted threshold. A scaling action may be determined based on the comparison. The scaling action may comprise at least one of a scale-up action that increases hardware capacity of at least one server computing device (that provides at least a portion of the computing resources), a scale-out action that increases an amount of computing resources that are allocated to the user, a scale-down action that decreases the hardware capacity of the at least one server computing device, and a scale-in action that decreases the amount of computing resources that are allocated to the user.

To facilitate these and other functions, dynamic threshold system 110 may comprise a usage charge obtaining engine 121, a threshold adjustment determining engine 122, a threshold comparing engine 123, a request generating engine 124, a charge function defining engine 125, and/or other engines. The term "engine", as used herein, refers to a combination of hardware and programming that performs a designated function. As is illustrated respect to FIG. 2, the hardware of each engine, for example, may include one or both of a processor and a machine-readable storage medium, while the programming is instructions or code stored on the machine-readable storage medium and executable by the processor to perform the designated function.

Usage charge obtaining engine 121 may obtain charges for usage (also referred herein as "usage charge," "costs," and the like) of computing resources (e.g., central processing unit (CPU) resources, storage resources, network resources, etc.) by services associated with a user from a beginning of a first time period to a current time. The computing resources, in some implementations, may comprise cloud resources. The usage (also referred herein as "use," "consumption," and the like) and/or the corresponding charges may be monitored, obtained, and/or stored in a data storage 129 and/or other database. For example, most of the cloud service providers have some ways to compute the cost of the resource usages. Some cloud monitoring tools, such as Ceilometer, can also provide the billing information.

Usage charge obtaining engine 121 may obtain a budget amount available to the user for using the computing resources during the first time period. For example, a user (e.g., resource consumer) may specify a budget by day, month, quarter, year, or any given time period. Thus, the usage charges may show the budget burn down. For example, the usage charges may comprise the costs related to computing resources that have been used and/or consumed by the user from the beginning of a particular month (e.g., the first time period) to a current time. In other words, the usage charges may indicate the budget burn down of that particular month up to the current point in time. In some implementations, the budget may determine a maximum resource utilization threshold such that any threshold being adjusted by threshold adjustment determining engine 122 (which is discussed in detail below) may not exceed this maximum threshold.

In some implementations, a certain amount of computing resources may be allocated for use (and/or consumption) by the user. In other words, the "allocated" resources may represent the resources that have been made available to the user for the user's usage or consumption. When additional computing resources are allocated to the user (e.g., a scale-out action), it may incur additional costs such as licensing fees. For example, the costs related to the additional allocation of the computing resources may be computed based on the duration that the additional computing resources are available to the user for the user's usage or consumption. In some implementations, the additional costs incurred by the new allocation of the computing resources may be added to the overall usage charge. In other implementations, the usage charge may exclude this type of additional costs related to the resource allocation.

Threshold adjustment determining engine 122 may dynamically adjust a resource utilization threshold based on at least one parameter. The at least one parameter may comprise the usage charges, a predetermined schedule, a geographical location of the computing resources, a temperature of at least one server computing device that provides at least a portion of the computing resources or the temperature of a space where the at least one server computing device is located, carbon footprint (e.g., energy and/or space usages), and/or other parameters.

Figure 5:
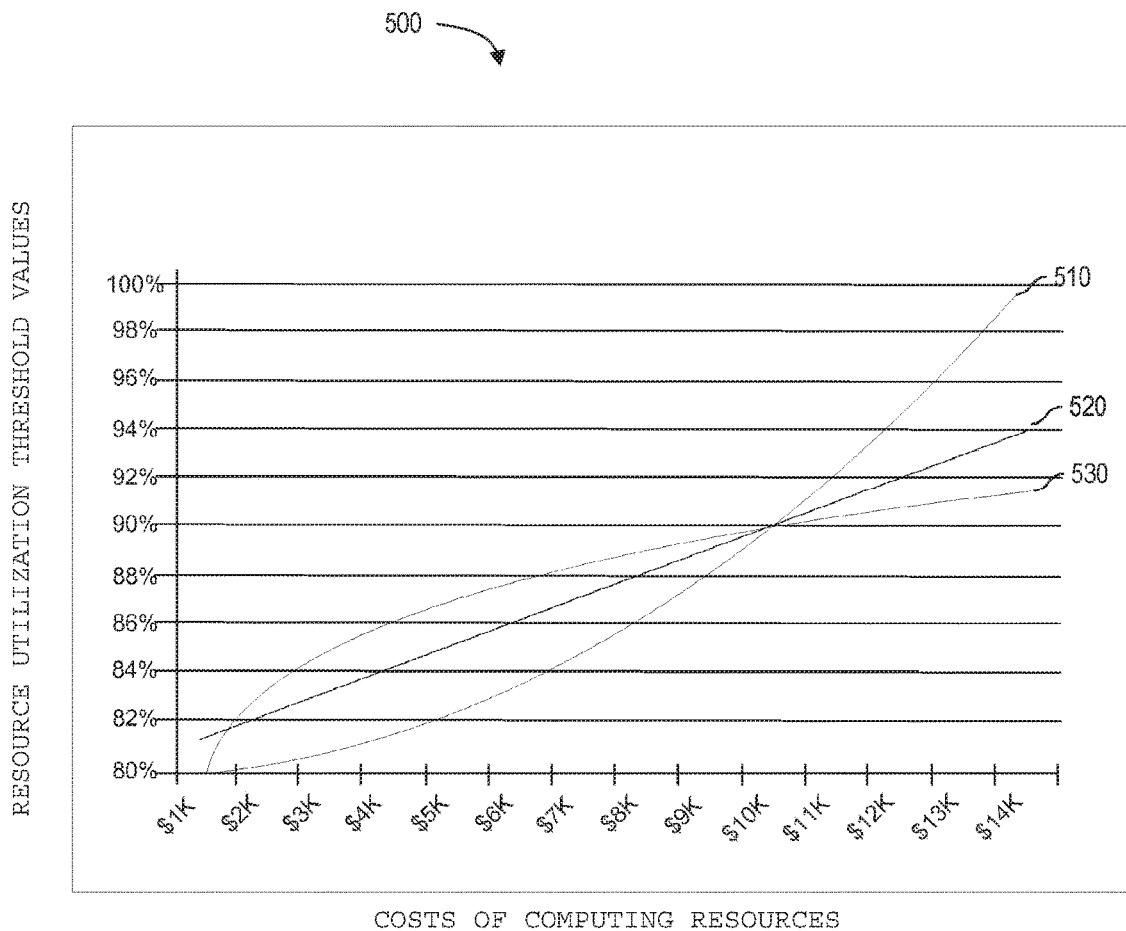
FIG. 5 is a diagram depicting an example graph of usage charge function that defines a relationship between usage charges and an adjustment value.

Threshold adjustment determining engine 122 may determine an adjustment value to be added to a first threshold value based on a function of the usage charges. The function of the usage charges may define a relationship between the usage charges and the adjustment value. Thus, the adjusted threshold value ($T_a$) may be calculated using the following formula: $T_a = f(C) + T_0$ where $f(C)$ represents an adjustment value in the function of the usage charges and $T_0$ represents the first threshold value or the initial threshold value. In some implementations, the function of the usage charges $f(C)$ defining the relationship between the usage charges and the adjustment value may be determined based on historical usage charge information associated with the user, which is discussed herein with respect to charge function defining engine 125 below. The relationship defined by the usage charge function may comprise a linear, non-linear, logarithmic, square, least square, or any statistical relationship between the two variables. An example usage charge function showing a relationship between the usage charges and an adjustment value is illustrated in FIG. 5.

In some implementations, the usage charges or the costs may comprise a rate of costs (e.g., budget burndown rate or spending rate). In other words, the rate of costs may indicate how fast the budget is spent. For example, the rate of costs, $f(C/t)$, may be defined by the costs divided by a second time period (t) between the beginning of the first time period (associated with the budget) and the current time. For example, whenever the spending rate is up, so is the threshold. On the other hand, the downward spending rate may push the threshold down as well.

Threshold adjustment determining engine 122 may adjust the dynamic threshold based on a predefined schedule. The upper and/or lower thresholds may be automatically adjusted to a predefined value based on a schedule. For example, if a virus scan is scheduled at 2:00 AM for one hour, the high threshold for the resource utilization rate may be scheduled to change from the initial threshold value of 90% utilization rate to 95% utilization rate at 2:00 AM. At 3:00 AM, the high threshold can be scheduled to change back from 95% to 90% utilization rate. Because it is less likely to have high external workload requests in the evening, as another example, the lower threshold for the resource utilization rate may be scheduled to be adjusted higher (e.g., 10% to 20% utilization rate) to save more resources. The schedule for automatically adjusting the thresholds may be automatically set by the system and/or manually set by a user.

Threshold adjustment determining engine 122 may adjust the dynamic threshold based on a geographical location of the computing resources. For example, the threshold may be adjusted based on a distance between at least one computing device that connects to or otherwise uses services associated with the user and where available computing resources are located. In this example, when the available resources are located farther away from the at least one computing device, the threshold may be increased which, in turn, makes it more difficult to trigger an automatic scale-out action.

Threshold adjustment determining engine 122 may adjust the dynamic threshold based on a temperature of at least one server computing device that provides at least a portion of the computing resources or the temperature of a space where the at least one server computing device is located. For example, if the server computing device gets overheated, then the threshold may be adjusted downward to make it easier to add additional computing resources such as another server computing device.

In some implementations, threshold adjustment determining engine 122 may adjust the resource utilization threshold based on a combination of multiple parameters. For example, the threshold may be defined as a function of both cost and carbon footprint: f(C, CF). In this way, the threshold may be adjusted according to both the cost and the carbon footprint. For example, the example usage charge function described in FIG. 5 may be changed from a 2-dimensional graph to a 3-dimensional graph. Although adjusting the threshold based on a combination of two parameters is discussed above, a combination of more than two parameters may be used to determine the adjusted threshold value.

Threshold comparing engine 123 may compare a utilization rate (also referred herein as a "usage rate" and the like) of the computing resources by the user to the adjusted threshold that is determined by threshold adjustment determining engine 122. The utilization rate being compared to the adjusted threshold may be a current utilization rate. For example, threshold comparing engine 123 may determine when a current usage rate of the cloud resources by the services associated with the cloud user violates a second threshold value where the second threshold value is a sum of the adjustment value (determined by threshold adjustment determining engine 122) and the first threshold value (e.g., the initial threshold value). In doing so, threshold comparing engine 123 may continuously monitor the current utilization rate to detect when the adjusted threshold or the second threshold value is violated (e.g., the current utilization rate being equal to or exceeding the adjust threshold or the second threshold).

In response to determining that the current usage rate violates the adjusted threshold or the second threshold value, request generating engine 124 may generate a request for at least one action. The request may comprise a request to generate an alert and/or notification. In some implementations, the alert may be provided to the user. Upon the receipt of the alert, the user may determine a scaling action to be performed in response to the violation of the adjusted threshold. The scaling action may comprise at least one of a scale-up action that increases hardware capacity of at least one server, a scale-out action that increases an amount of computing resources that are allocated to the user, a scale-down action that decreases the hardware capacity of the at least one server, and/or a scale-in action that decreases the amount of computing resources that are allocated to the user.

In some implementations, the request may comprise a request to perform an automatic scaling action in response to the threshold violation. For example, in response to determining that the current usage rate violates the adjusted threshold, request generating engine 124 may generate a request to allocate additional computing resources to the user (e.g., scale-out action).

In some implementations, the current usages charges accrued may reach the total budget amount for the first time period. The adjusted threshold in this case may be equal to the maximum resource utilization threshold. However, even when the current utilization rate violates the adjusted threshold (or the maximum resource utilization threshold), no request for an automatic scale-out or scale-up action may be generated in response to the threshold violation. Scale-out or scale-up action usually require additional costs to be added to the billing. And when the budget is already depleted, it may not make sense to add more to the costs. In some implementations, an alert notifying the user that the budget has been reached and/or the current utilization rate violates the maximum resource utilization threshold may be generated and/or provided to the user.

Charge function defining engine 125 may obtain historical usage charge information associated with the user. The historical usage charge information may comprise information related to the usage charges prior to the beginning of the first time period (e.g., the budget period). In other words, the past spending patterns may be collected and/or used to determine the function of the usage charges. For example, the historical usage charge information may be statistically analyzed to determine the statistical relationship between the usage charge and an adjustment value. The relationship defined by the usage charge function may comprise a linear, non-linear, logarithmic, square, least square, or any statistical relationship between the two variables. An example usage charge function showing a relationship between the usage charges and an adjustment value is illustrated in FIG. 5.

In performing their respective functions, engines 121-125 may access data storage 129. Data storage 129 may represent any memory accessible to dynamic threshold system 110 that can be used to store and retrieve data. Data storage 129 may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Dynamic threshold system 110 may access data storage 129 locally or remotely via network 50 or other networks.

Data storage 129 may include a database to organize and store data. Database may be, include, or interface to, for example, an Oracle™ relational database sold commercially by Oracle Corporation. Other databases, such as Informix™, DB2 (Database 2) or other data storage, including file-based (e.g., comma or tab separated files), or query formats, platforms, or resources such as OLAP (On Line Analytical Processing), SQL (Structured Query Language), a SAN (storage area network), Microsoft Access™, MySQL, PostgreSQL, HSpace, Apache Cassandra, MongoDB, Apache CouchDB™, or others may also be used, incorporated, or accessed. The database may reside in a single or multiple physical device(s) and in a single or multiple physical location(s). The database may store a plurality of types of data and/or files and associated data or file description, administrative information, or any other data.

Figure 2:
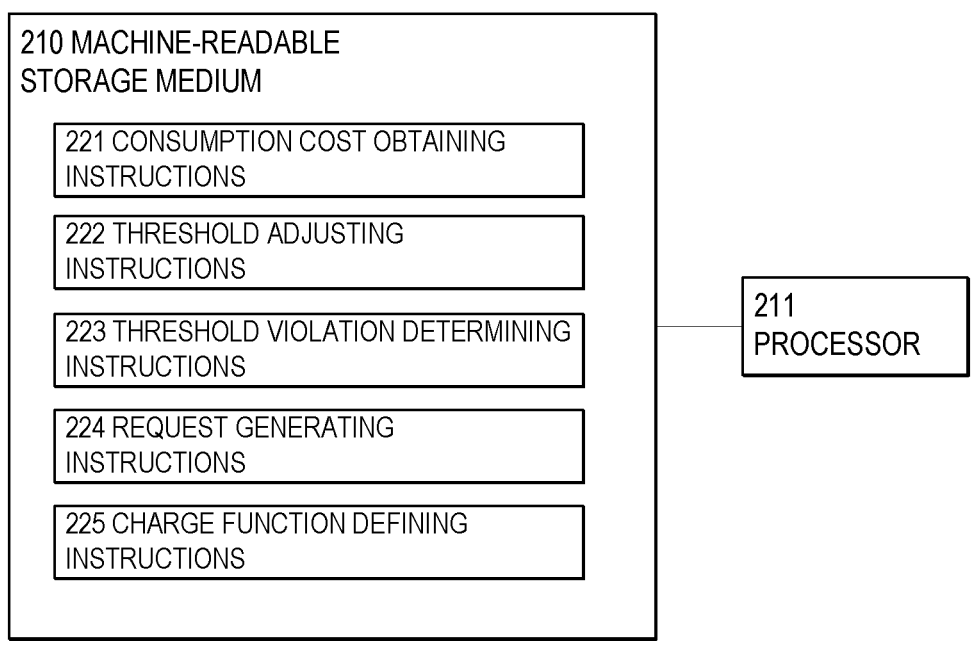
FIG. 2 is a block diagram depicting an example machine-readable storage medium comprising instructions executable by a processor for adjusting a dynamic threshold based on the costs of consumption of shared computing resources allocated to a user.

FIG. 2 is a block diagram depicting an example machine-readable storage medium 210 comprising instructions executable by a processor for adjusting a dynamic threshold based on the costs of consumption of shared computing resources allocated to a user.

In the foregoing discussion, engines 121-125 were described as combinations of hardware and programming. Engines 121-125 may be implemented in a number of fashions. Referring to FIG. 2, the programming may be processor executable instructions 221-225 stored on a machine-readable storage medium 210 and the hardware may include a processor 211 for executing those instructions. Thus, machine-readable storage medium 210 can be said to store program instructions or code that when executed by processor 211 implements dynamic threshold system 110 of FIG. 1.

Machine-readable storage medium 210 may be any electronic, magnetic, optical, or other physical storage device that contains or stores executable instructions. In some implementations, machine-readable storage medium 210 may be a non-transitory storage medium, where the term "non-transitory" does not encompass transitory propagating signals. Machine-readable storage medium 210 may be implemented in a single device or distributed across devices. Likewise, processor 211 may represent any number of processors capable of executing instructions stored by machine-readable storage medium 210. Processor 211 may be integrated in a single device or distributed across devices. Further, machine-readable storage medium 210 may be fully or partially integrated in the same device as processor 211, or it may be separate but accessible to that device and processor 211.

In one example, the program instructions may be part of an installation package that when installed can be executed by processor 211 to implement dynamic threshold system 110. In this case, machine-readable storage medium 210 may be a portable medium such as a floppy disk, CD, DVD, or flash drive or a memory maintained by a server from which the installation package can be downloaded and installed. In another example, the program instructions may be part of an application or applications already installed. Here, machine-readable storage medium 210 may include a hard disk, optical disk, tapes, solid state drives, RAM, ROM, EEPROM, or the like.

Processor 211 may be at least one central processing unit (CPU), microprocessor, and/or other hardware device suitable for retrieval and execution of instructions stored in machine-readable storage medium 210. Processor 211 may fetch, decode, and execute program instructions 221-225, and/or other instructions. As an alternative or in addition to retrieving and executing instructions, processor 211 may include at least one electronic circuit comprising a number of electronic components for performing the functionality of at least one of instructions 221-225, and/or other instructions.

In FIG. 2, the executable program instructions in machine-readable storage medium 210 are depicted as consumption cost obtaining instructions 221, threshold adjusting instructions 222, threshold violation determining instructions 223, request generating instructions 224, and charge function defining instructions 225. Instructions 221-225 represent program instructions that, when executed, cause processor 211 to implement engines 121-125, respectively.

Figure 3:
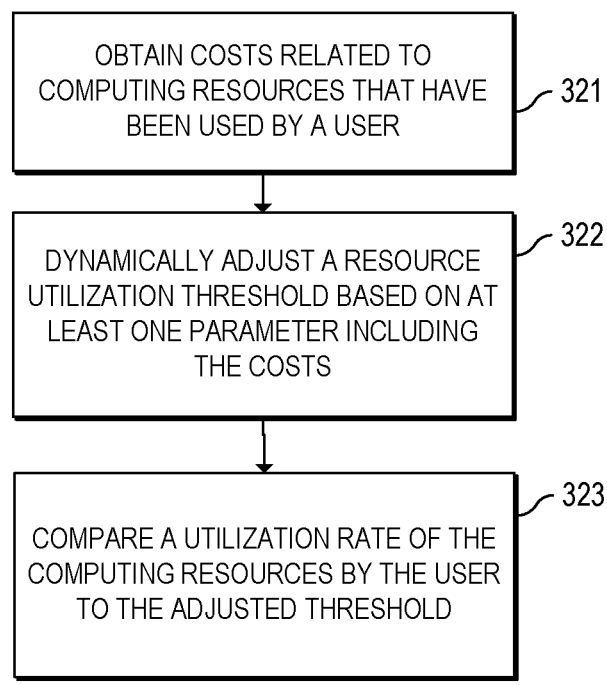
FIG. 3 is a flow diagram depicting an example method for dynamically adjusting a resource utilization threshold based on at least one parameter including costs related to computing resources that have been used by a user.

FIG. 3 is a flow diagram depicting an example method 300 for dynamically adjusting a resource utilization threshold based on at least one parameter including costs related to computing resources that have been used by a user. The various processing blocks and/or data flows depicted in FIG. 3 (and in the other drawing figures such as FIG. 4) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 300 as illustrated (and described in greater detail below) is meant be an example and, as such, should not be viewed as limiting. Method 300 may be implemented in the form of executable instructions stored on a machine-readable storage medium, such as storage medium 210, and/or in the form of electronic circuitry.

Method 300 may start in block 321 where costs related to computing resources that have been used by a user may be obtained. The usage and/or the corresponding costs may be monitored, obtained, and/or stored. For example, most of the cloud service providers have some ways to compute the cost of the resource usages. Some cloud monitoring tools, such as Ceilometer, can also provide the billing information.

In block 322, method 300 may dynamically adjust a resource utilization threshold based on at least one parameter including the costs. A function of the usage costs may define a relationship between the costs and the adjustment value. Thus, the adjusted threshold value ($T_a$) may be calculated using the following formula: $T_a = f(C) + T_0$ where $f(C)$ represents an adjustment value in the function of the costs and $T_0$ represents the first threshold value or the initial threshold value. In some implementations, the function of the costs f(C) defining the relationship between the costs and the adjustment value may be determined based on historical usage charge information associated with the user.

In block 323, method 300 may include comparing a utilization rate of the computing resources by the user to the adjusted threshold. The utilization rate being compared to the adjusted threshold may be a current utilization rate. For example, method 300 may determine when a current utilization rate of the resources by the user violates the adjusted threshold.

Referring back to FIG. 1, usage charge obtaining engine 121 may be responsible for implementing block 321. Threshold adjustment determining engine 122 may be responsible for implementing block 322. Threshold comparing engine 123 may be responsible for implementing block 323.

Figure 4:
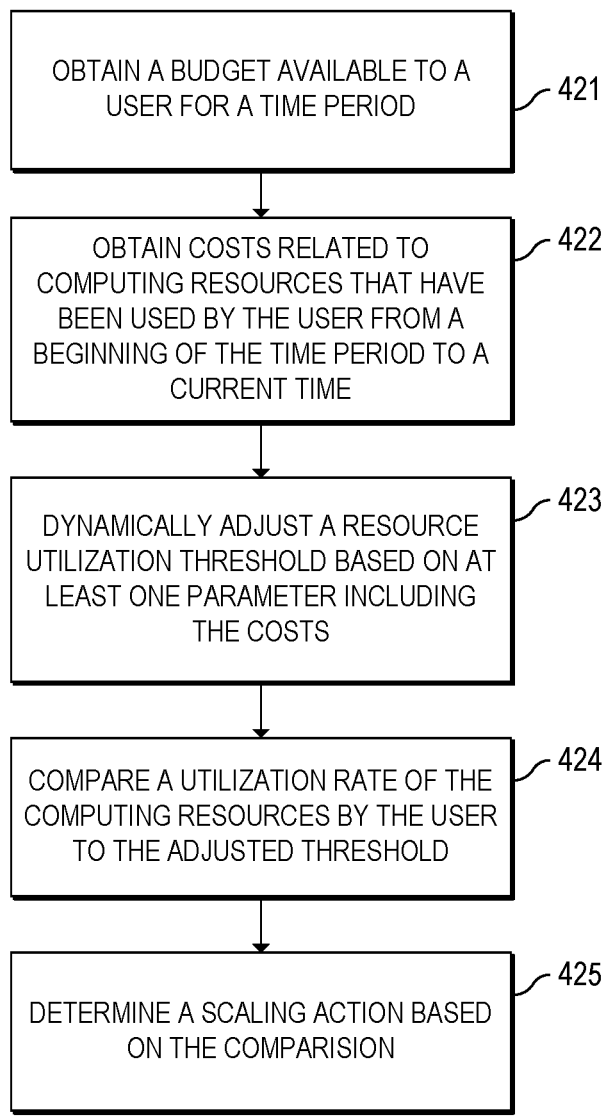
FIG. 4 is a flow diagram depicting an example method for dynamically adjusting a resource utilization threshold based on at least one parameter including costs related to computing resources that have been used by a user and determining a scaling action based on a comparison between a utilization rate of the computing resources and the adjusted threshold.

FIG. 4 is a flow diagram depicting an example method 400 for dynamically adjusting a resource utilization threshold based on at least one parameter including costs related to computing resources that have been used by a user and determining a scaling action based on a comparison between a utilization rate of the computing resources and the adjusted threshold. Method 400 as illustrated (and described in greater detail below) is meant be an example and, as such, should not be viewed as limiting. Method 400 may be implemented in the form of executable instructions stored on a machine-readable storage medium, such as storage medium 210, and/or in the form of electronic circuitry.

Method 400 may start in block 421 where a budget available to a user for a time period may be obtained. For example, a user may specify a budget by day, month, quarter, year, or any given time period.

In block 422, method 400 may include obtaining costs related to the computing resources that have been used by the user from a beginning of the time period to a current time. Thus, the costs may show the budget burndown. For example, the costs may comprise the costs related to the computing resources that have been used and/or consumed by the user from the beginning of a particular month (e.g., the time period) to a current time. In other words, the costs may indicate the budget burndown of that particular month up to the current point in time.

In block 423, method 400 may dynamically adjust a resource utilization threshold based on at least one parameter including the costs. A function of the usage costs may define a relationship between the costs and an adjustment value.

Thus, the adjusted threshold value ($T_a$) may be calculated using the following formula: $T_a=f(C)+T_0$ where f(C) represents an adjustment value in the function of the costs and $T_0$ represents the first threshold value or the initial threshold value. In some implementations, the function of the costs f(C) defining the relationship between the costs and the adjustment value may be determined based on historical usage charge information associated with the user.

In block 424, method 400 may compare a utilization rate of the computing resources by the user to the adjusted threshold. The utilization rate being compared to the adjusted threshold may be a current utilization rate. For example, method 400 may determine when a current utilization rate of the resources by the user violates the adjusted threshold.

In block 425, method 400 may determine a scaling action based on the comparison. The scaling action may comprise at least one of a scale-up action that increases hardware capacity of at least one server computing device (that provides at least a portion of the computing resources), a scale-out action that increases an amount of computing resources that are allocated to the user, a scale-down action that decreases the hardware capacity of the at least one server computing device, and a scale-in action that decreases the amount of computing resources that are allocated to the user.

Referring back to FIG. 1, usage charge obtaining engine 121 may be responsible for implementing blocks 421 and 422. Threshold adjustment determining engine 122 may be responsible for implementing block 423. Threshold comparing engine 123 may be responsible for implementing block 424. Request generating engine 124 may be responsible for implementing block 425.

FIG. 5 is a diagram depicting an example graph 500 of usage charge function that defines a relationship between usage charges and an adjustment value.

Example graph 500 may comprise a usage charge function defining a square relationship 510, a linear relationship 520, and/or a logarithmic relationship 530. The relationship defined by the usage charge function may include any other statistical relationship between the two variables. The horizontal axis of graph 500 may represent the costs of computing resources that have been used and/or consumed by a user so far since the beginning of the budget time period.

The vertical axis of graph 500 may display resource utilization threshold values. In graph 500, the initial value of the threshold (To) may be 80%.

For example, the linear function 520 may show the threshold incremental trend that is proportional to the total money spent. The more the money has been spent the higher the threshold value is, thus, the harder to scale out by adding additional computing resources. In another example, the logarithmic function 530 may describe the quicker increase of the threshold value with the increasing cost at the beginning of the budget time period. But after a certain point, the increase of threshold value slows down. On the other hand, the square function 510 may prescribe a slower initial increase of threshold value with the increasing cost. It then drastically increases after a certain point as the costs increase. When the total costs reach the budget amount (e.g., approximately $14K), there may be no requests (e.g., an alert or a scaling action) may be generated even if the corresponding utilization threshold is violated.

The foregoing disclosure describes a number of example implementations for dynamic adjustment of thresholds. The disclosed examples may include systems, devices, computer-readable storage media, and methods for dynamic adjustment of thresholds. For purposes of explanation, certain examples are described with reference to the components illustrated in FIGS. 1-2. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 3-4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for execution by a computing device for dynamically adjusting thresholds, the method comprising:
   obtaining:
      a rate of costs related to computing resources that have been used by a user over a time period,
      a financial budget available to the user for the time period, and
      a current utilization rate of the computing resources;
   dynamically adjusting a resource utilization threshold based on:
      the rate of costs related to the computing resources that have been used by the user, and
      a geographic location of the computing resources;
   comparing the utilization rate of the computing resources by the user to the adjusted threshold;

determining a maximum resource utilization threshold corresponding to the adjusted threshold based on the financial budget, wherein the adjusted threshold does not exceed a maximum utilization threshold; and determining a scaling action based on the comparison.

2. The method of claim 1, wherein the rate of costs comprise a rate of costs related to computing resources that have been used by the user of the computing resources that have been allocated for use by the user.

3. The method of claim 1, wherein the computing resources are provided by at least one server computing device, and wherein the scaling action comprises at least one of:

a scale-up action that increases hardware capacity of the at least one server computing device;

a scale-out action that increases an amount of computing resources that are allocated to the user;

a scale-down action that decreases the hardware capacity of the at least one server computing device; and a scale-in action that decreases the amount of computing resources that are allocated to the user.

4. The method of claim 1, wherein the rate of costs comprise a rate of costs related to computing resources that have been used of the computing resources that have been allocated for use by the user from a beginning of the time period to a current time.

5. A non-transitory machine-readable storage medium comprising instructions executable by a processor of a computing device for dynamically adjusting thresholds, the non-transitory machine-readable storage medium comprising:

instructions to monitor consumption of a first set of shared computing resources that are allocated to a user;

instructions to obtain:

a first rate of costs of the consumption from a first point in time to a second point in time, a financial budget available to the user from the first point in time to the second point in time, and a current utilization rate of the first set of shared computing resources;

instructions to adjust a dynamic resource utilization threshold based on:

the first rate of costs, and a geographic location of the first set of shared computing resources;

instructions to determine a maximum resource utilization threshold corresponding to the adjusted threshold based on the financial budget, wherein the adjusted threshold does not exceed a maximum utilization threshold;

instructions to obtain:

a second rate of costs of the consumption from the first point in time to a third point in time, wherein the third point in time occurs after the second point in time, a financial budget available to the user from the second point in time to the third point in time, and a current utilization rate of the first set of shared computing resources; and instructions to adjust the dynamic resource utilization threshold based on:

the second rate of costs, and the geographic location of the first set of shared computing resources.

6. The non-transitory machine-readable storage medium of claim 5, further comprising:

instructions to determine whether the current utilization rate of the first set of shared computing resources by the user violates the dynamic resource utilization threshold;

in response to determining that the current utilization rate violates the dynamic resource utilization threshold, instructions to allocate a second set of shared computing resources for consumption by the user;

instructions to obtain a third rate of costs for allocating the second set of shared computing resources for consumption by the user; and instructions to adjust the dynamic resource utilization threshold based on the third rate of costs.

7. The non-transitory machine-readable storage medium of claim 5, further comprising:

instructions to adjust the dynamic resource utilization threshold based on a predefined schedule.

8. The non-transitory machine-readable storage medium of claim 5, wherein the first set of shared computing resources is provided by at least one server computing device, instructions to adjust the dynamic resource utilization threshold based on a temperature of the at least one server computing device or the temperature of a space where the at least one server computing device is located.

9. A system for dynamically adjusting thresholds comprising:

a processor to:

obtain:

a rate of costs for usage of cloud resources by services associated with a cloud user from a beginning of a time period to a current time, a financial budget available to the cloud user from the beginning of the time period to the current time, and a current utilization rate of the cloud resources;

determine whether the current utilization rate of the cloud resources exceeds a first resource utilization threshold;

determine an adjustment value to be added to the first resource utilization threshold value based on:

the rate of costs for the usage of the cloud resources, a geographic location of the cloud resources, and the current utilization rate of the cloud resources exceeding the first resource utilization threshold, wherein a relationship between the rate of costs and the adjustment value from the beginning of the time period to the current time defines a function of the rate of costs;

determine a maximum resource utilization threshold corresponding to the adjusted utilization threshold based on the financial budget, wherein the adjusted utilization threshold does not exceed a maximum utilization threshold;

determine when the current utilization rate of the cloud resources by the services associated with the cloud user exceeds a second resource utilization threshold value, wherein the second resource utilization threshold value is a sum of the adjustment value and the first resource utilization threshold value; and in response to determining that the current usage rate exceeds the second resource utilization threshold value, generate a request to allocate additional cloud resources to the cloud user.

10. The system of claim 9, wherein the processor is to:

obtain the financial budget amount available to the cloud user for using the cloud resources during the time period; and determine the second resource utilization threshold value when usage charges reach the financial budget, wherein no request to allocate additional cloud resources to the cloud user is generated in response to determining that the current usage rate exceeds the second resource utilization threshold value.

11. The system of claim 9, wherein the processor is to:

obtain historical usage charge information associated with the cloud user, the historical usage charge information comprising information related to a rate of costs prior to the beginning of the time period; and determine the function of the rate of costs based on the historical usage charge information.

12. The system of claim 9, wherein the processor is to:

in response to determining that the current usage rate exceeds the second resource utilization threshold value, generate an alert to notify the cloud user that the current usage rate exceeds the second resource utilization threshold value; and receive a scaling action from the cloud user, wherein the scaling action comprises at least one of a scale-up action that increases hardware capacity of at least one cloud server, a scale-out action that increases an amount of cloud resources that are allocated to the user, a scale-down action that decreases the hardware capacity of the at least one cloud server, and a scale-in action that decreases the amount of cloud resources that are allocated to the user.

13. The system of claim 9, wherein the cloud resources comprise central processing unit (CPU) resources.

* * * * *